United States Patent [19]

Kawashima et al.

[11] 3,920,701

[45] Nov. 18, 1975

[54] PROCESS FOR PRODUCING α-CHLORO-β-(3,4-DIHYDROXYPHENYL) PROPIONITRILE OR AN O-PROTECTED DERIVATIVE THEREOF

[75] Inventors: Hideaki Kawashima; Masanao Ozaki, both of Kawasaki; Yoshitaka Yamada, Zushi; Izumi Kumashiro, Yokohama; Takehiko Ichikawa, Kawasaki, all of Japan

[73] Assignee: Ajinomoto Co., Inc., Tokyo, Japan

[22] Filed: Oct. 4, 1973

[21] Appl. No.: 403,387

Related U.S. Application Data

[63] Continuation-in-part of Ser. No. 18,703, March 11, 1970, abandoned.

[30] Foreign Application Priority Data

Mar. 26, 1969  Japan.............................. 44-22868
Aug. 6, 1969   Japan.............................. 44-62157

[52] U.S. Cl........... 260/340.5; 260/462; 260/465 F; 424/282
[51] Int. Cl.²...................................... C07D 317/44
[58] Field of Search............. 260/340.5, 465 F, 462

[56] References Cited

UNITED STATES PATENTS 3,442,909  5/1969  Sletzinger........................... 260/465
3,801,601  4/1974  Reinhold et al. ................. 260/340.5

FOREIGN PATENTS OR APPLICATIONS 53,701  11/1967  Germany

OTHER PUBLICATIONS

Olah: *Friedel–Crafts and Related Reactions*, Vol. II, part 1, 1964, pp. 454–467, Interscience Publishers.

*Primary Examiner*—Donald G. Daus
*Assistant Examiner*—James H. Turnipseed
*Attorney, Agent, or Firm*—Oblon, Fisher, Spivak, McClelland & Maier

[57]  ABSTRACT

α-Chloro-β-(3,4-dihydroxyphenyl)-propionitrile and its O-protected derivatives are produced by reacting 1,2-dihydroxybenzene or an O-protected derivative thereof with 2,3-dichloropropionitrile in the presence of a Lewis acid.

6 Claims, No Drawings

PROCESS FOR PRODUCING α-CHLORO-β-(3,4-DIHYDROXYPHENYL) PROPIONITRILE OR AN O-PROTECTED DERIVATIVE THEREOF

RELATIONSHIP TO PENDING APPLICATIONS

This application is a Continuation-In-Part of application Ser. No. 18,703, filed Mar. 11, 1970 now abandoned.

BACKGROUND OF THE INVENTION

1. Field of the Invention:

This invention relates to a method of forming α-chloro-β-(3,4,-dihydroxyphenyl)-propionitrile or the corresponding O-protected derivatives thereof. These compounds can be used as intermediates for the formation of 3,4-dihydroxyphenylalanine, which is a known pharmaceutical, useful for the treatment of Parkinson's disease.

2. Description of the Prior Art:

3,4-dihydroxyphenylalanine is now highly regarded as an effective medicament in the treatment of Parkinson's disease. Heretofore, however, in the past, the preparatin of 3,4-dihydroxyphenylalanine has been considered to be somewhat difficult and complex. It has now been found that 3,4-dihydroxyphenylalanine may be easily synthesized from α-chloro-β-(3,4,-dihydroxyphenyl)-propionitrile or an O-protected derivative thereof, which can be formed by a unique application of the Friedel-Crafts reaction. It has been unknown prior to the present invention to introduce a chloroalkyl group into an aromatic ring by use of a compound in which both a nitrile group and a chlorine group are attached to a carbon atom and also a chlorine group to its adjacent carbon atom.

In Drakowzal, Olah: Friedel-Crafts and Related Reactions, Vol. II, Part I, pp. 454–67, Interscience Publishers (1964), for instance, it is suggested that all the chlorine atoms would be expected to enter the reaction. In contrast, it has now been found that when 2,3-dichloropropionitrile is reacted with a dihydroxybenzene derivative, as in the present invention, that only one of the chlorines enter the reaction.

SUMMARY OF THE INVENTION

Accordingly, one object of this invention is to provide a unique synthesis method whereby α-chloro-β-(3,4-dihydroxyphenyl)-propionitrile can be prepared.

This and other objects of this invention as will hereinafter become more readily apparent can be attained by reacting 1,2-dihydroxybenzene, or an O-protected derivative thereof, with 2,3-dichloropropionitrile in the presence of a Lewis acid. These intermediates can then further be reacted by hydrolysis and amination to form the 3,4-dihydroxyphenylalanine.

DETAILED DESCRIPTION OF THE PREFERRED EMBODIMENTS

The reaction of 2,3-dichloropropionitrile with 1,2-dihydroxybenzene or an O-protected derivative thereof is usually effected by heating a mixture of the reactants with a catalyst and/or a co-catalyst. 2,3-dichloropropionitrile is usually present in an amount of greater than 0.6 and preferably 1.0 to 1.2 moles per mole of a phenyl ring of 1,2-dihydroxybenzene or an O-protected derivative thereof.

The 1,2-dihydroxybenzene or the O-protected derivative of the same used in the present invention are compounds of the general structure:

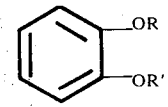

wherein R and R' are independently selected from the group consisting of lower alkyl, preferably 1 – 6 carbon atoms, more preferably 1 – 3 carbon atoms, hydrogen, or R and R' may be taken together to form a group such as lower alkylene, alkylidene, cyclohexylidene, or:

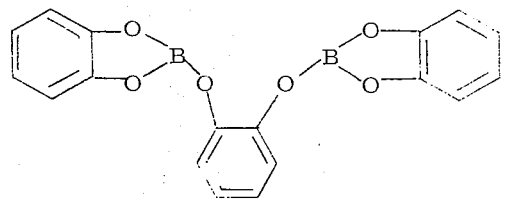

For example, suitable compounds include: 1,2-dihydroxybenzene, guaiacol, veratrol, 1,2-methylenedioxybenzene, 1,2-isopropylidenedioxybenzene, 1,2-cyclohexylidenedioxybenzene, 1,2-ethylidenedioxybenzene, or tri-O-phenylenediborate which is produced by reacting 1,2-dihydroxybenzene with boric acid.

Suitable catalysts for this reaction include the Lewis acids, which are known as being useful for Friedel-Crafts reactions. Suitable catalysts include: aluminum chloride, ferric chloride, stannic chloride, boron fluoride, tellurium dichloride, tellurium tetrachloride, antimony pentachloride, titanium tetrachloride, bismuth chloride, zinc chloride or other similar Lewis acids. Suitable combinations of these Lewis acids can also be used as catalysts, for example aluminum chloride and titanium tetrachloride, or aluminum chloride and zinc chloride. The catalyst may be used in an amount of less than 1, and suitably 0.1, moles per mole of a phenyl ring of 1,2-dihydroxybenzene or the O-protected derivative therof.

It has also been found that the use of mineral acid, water, silicon compound or a lower alkyl alcohol, will increase the yield of the reaction, when used in combination with a Lewis acid. Good results are obtained when using such additives or co-catalysts as methanol, ethanol, propanol, or butanol. When an alcohol is used, it is desirable that it be present in amounts of less than 1.0 and preferably from 0.3 to 1.0, moles per mole of the Lewis acid. When a mineral acid or water is used as the additive or co-catalyst, it is desirable that water in the additive or co-catalyst be present in amounts of less than 1 mole per mole of Lewis acid. When a large amount of a mineral acid is used as the additive or co-catalyst, the elimination of the O-protecting group tends to occur as the reaction proceeds. Therefore, it is desirable that it be present in a small amount.

The order of addition of the 1,2-dihydroxybenzene or the O-protected derivative thereof, the 2,3-dichloropropionitrile, the catalyst and/or the additive or co-catalyst is not critical. Especially good results are obtained, however, when a small amount of the catalyst and/or the co-catalyst is used in the initial stages of the reaction and thereafter the bulk of the catalyst and/or co-catalyst with additional amounts of 2,3-dichloropropionitrile are added as the reaction proceeds.

The reaction usually occurs at temperatures of from 50° to 150°C, and preferably from 80° to 120°C. If the α-chloro-β-(3,4-dioxyphenyl)-propionitrile or the corresponding O-protected compound, is used to directly form the 3,4-dihydroxyphenylalanine, it is usually not necessary to separate the intermediate before effecting further reaction. When the intermediate is to be separated, however, this is accomplished by pouring the reaction mixture into ice water, extracting the intermediate with a suitable organic solvent, such as chloroform, washing the extract with water and dilute sodium hydrocarbonate aqueous solution, drying the wash, removing the solvent, and obtaining the refined product by distillation under reduced pressure or by recrystallization from ethanol or other organic solvent.

The reactants used in this process can be obtained quite easily by conventional methods. 1,2-dihydroxybenzene or the O-protected derivative of the same can be obtained by extraction of natural products or by conventional synthetic methods. 2,3-dichloropropionitrile can be obtained efficiently and economically by reaction of chlorine with acrylonitrile.

The particular protecting group on the dioxy functionalities will depend upon the particular O-protected 1,2-dihydroxybenzene used as a reactant. In other words, the protecting group does not enter into the reaction but only functions to protect the two active sites on the benzene ring. When the dihydroxy benzene is subjected to reaction, it is preferred to protect the oxy group in order to prevent the possibility of chelate formation with any available metal ions present in the reaction medium. In each instance, the corresponding 3,4-dihydroxyphenyl derivative of the α-chloro-β-(3,4-dihydroxyphenyl)-propionitrile will be obtained. These products can be shown structurally as:

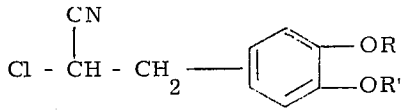

wherein R and R' are defined as above, or:

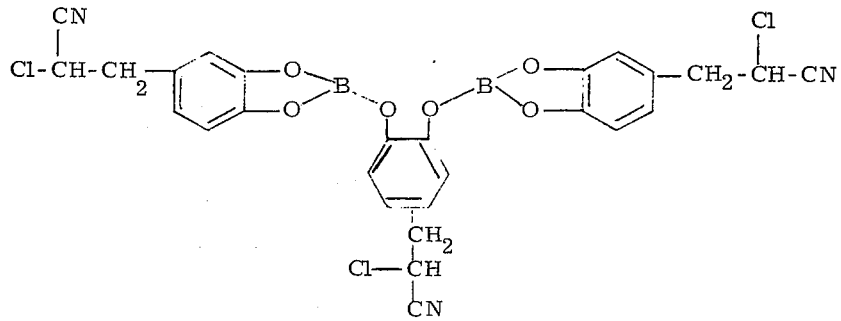

These compounds can then further be reacted to form 3,4-dioxyphenylalanine by any of several techniques including: (I) hydrolyzing the intermediate with a mineral acid, aminating the hydrolyzed derivative with ammonia and, eliminating its O-protecting group, if necessary; (II) aminating the intermediate with ammonia, hydrolyzing the aminated derivative with a mineral acid and eliminating its O-protecting group if necessary; (III) simultaneously aminating the intermediate and eliminating its O-protecting group; (IV) simultaneously hydrolyzing the intermediate and eliminating its O-protecting group.

Although the novel α-chloro-β-(3,4-dihydroxyphenyl)-propionitrile or the O-protected derivatives thereof are useful in the preparation of 3,4-dihydroxyphenylalanine, they may also be used as intermediates for producing anodyne, an antispasmodic or a local anesthetic.

Having generally described the invention, a further understanding can be obtained by reference to certain specific Examples which are provided herein for purposes of illustration only and are not intended to be limiting in any manner.

EXAMPLE 1

A mixture consisting of 13.8 g (0.1 mole of veratrol and 18.6 g (0.15 mole) of 2,3-dichloropropionitrile was prepared, and the catalyst listed in Table I was added thereto. The reaction mixture was heated with stirring. The resulting solution was cooled and was poured into ice water, and then was extracted with three 50 ml portions of chloroform. This chloroform layer was washed with 100 ml of water. The chloroform layer was again washed with 5% sodium hydrocarbonate aqueous solution first, and then with water.

The washed solution was dried with sodium sulfate anhydride. After chloroform was distilled off, there was obtained α-chloro-β-(3,4-dimethoxyphenyl)-propionitrile as a fraction having a boiling point of 159° – 162°C/1.5 mmHg by distillation under reduced pressure.

The reaction conditions and the results are summarized in Table I.

TABLE I

| Run No. | Catalyst Species | Amount Used(g) | Reaction Temp. (°C) | Reaction Time (hr.) | Amount of Formation(g) | Yield (%) |
|---|---|---|---|---|---|---|
| 1 | Aluminum chloride anhydride | 1.3 | 100 | 6 | 8.3 | 36.7 |
| 2 | Boron fluoride etherate | 14.2 | 100 | 3 | 7.7 | 34.2 |
| 3 | Ferric chloride anhydride | 1.6 | 80 | 6 | 7.0 | 31.2 |

The fraction obtained according to Run No. 1 was dissolved in hot ethanol, and was then cooled. Cyrstals having a melting point of from 66° to 67°C were obtained. The data of elemental analysis were:

| | C | H | N | Cl(%) |
|---|---|---|---|---|
| Found: | 58.70 | 5.55 | 6.18 | 15.86 |
| Calculated for $C_{11}H_{12}NO_2Cl$: | 58.54 | 5.36 | 6.21 | 15.71 |

EXAMPLE 2

To the same starting mixture as used in Example 1, 1.3 g of aluminum chloride anhydride and 0.95 g of titanium tetrachloride were added. The reaction mixture was heated to 100°C with stirring for 3 hours. The resulting solution was then treated as in Example 1 to obtain 10.9 g (yield: 48.5%) of α-chloro-β-(3,4-dimethoxyphenyl)-propionitrile.

EXAMPLE 3

1.3 g of aluminum chloride anhydride and 0.41 ml of the co-catalyst listed in Table II was added to the same starting mixture as used in Example 1. This reaction mixture was heated to 100°C with stirring for 6 hours.

The resulting solution was then treated by the same method as in Example 1. α-Chloro-β-(3,4-dimethoxyphenyl)-propionitrile was obtained as a fraction having a boiling point of 160° – 166°C/2.8 mmHg by distillation under reduced pressure. The relationship between the co-catalysts and the yield is shown in Table II.

TABLE II

| Run No. | Co-Catalyst | Amount of Formation (g) | Yield (%) |
|---|---|---|---|
| 1 | ethanol | 13.7 | 60.6 |
| 2 | methanol | 12.2 | 54.0 |
| 3 | n-propanol | 13.3 | 58.8 |

Ethanol was added to the fraction obtained according to Run No. 1, which crystallized immediately. Recrystallization from ethanol gave crystals having a melting point of from 67° to 68°C. The values of elemental analysis of these crystals agreed well with the calculated ones.

| | C | H | N | Cl(%) |
|---|---|---|---|---|
| Found: | 58.63 | 5.51 | 6.03 | 15.62 |
| Calculated for $C_{11}H_{12}NO_2Cl$: | 58.54 | 5.31 | 6.21 | 15.71 |

EXAMPLE 4

In a modification of Example 3, Run No. 3, 12.4 g of guaiacol was used instead of veratrol. The reaction mixture was treated by the same method as in Example 1 to obtain 13.1 g (yield: 62.0%) of α-chloro-β-(3,(4)-hydroxy-4(3)-methoxyphenyl)-propionitrile as a fraction having a boiling point of 153° – 158°C/2.8 mmHg. The fraction having a boiling point of 147° – 149°C/1.5 mmHg was obtained by redistillation. The elemental analysis data were:

| | C | H | N | Cl(%) |
|---|---|---|---|---|
| Found: | 56.93 | 4.82 | 6.86 | 16.57 |
| Calculated for $C_{10}H_{10}NO_2Cl$: | 56.75 | 4.76 | 6.62 | 16.75 |

EXAMPLE 5

To the same starting mixture as used in Example 1, 1.3 g of aluminum chloride anhydride was added and dissolved completely. Thereafter, the co-catalyst listed in Table III was added to the mixture. The reaction mixture was heated to 100°C with stirring for 3 hours. The resulting solution was then treated as in Example 1 to obtain α-chloro-β-(3,4-dimethoxyphenyl)-propionitrile. The yields under various reaction conditions are listed in Table III.

TABLE III

| Run No. | Co-Catalyst Species | Amount Used (g) | Amount of Formation (g) | Yield (%) |
|---|---|---|---|---|
| 1 | water | 0.09 | 9.3 | 41.3 |
| 2 | conc. hydrochloric acid | 0.23 | 11.3 | 50.0 |
| 3* | 10%-phosphoric acid | 0.20 | 10.1 | 44.7 |
| 4 | 10%-sulfuric acid | 0.20 | 11.8 | 52.3 |
| 5 | silica-gel (100–200 mesh) | 1.5 | 11.1 | 49.2 |
| 6 | silicon tetrachloride | 0.85 | 8.7 | 38.5 |

*Reaction Time in Run No. 3 was 1 Hour.

EXAMPLE 6

To a mixture consisting of 13.8 g of veratrol and 14.9 g of 2,3-dichloropropionitrile, 1.3 g of aluminum chloride was added and dissolved.

0.41 ml of ethanol was added to the mixture, and then it was heated to 100°C with stirring for 2 hours. A mixture of 9.9 g of 2,3-dichloropropionitrile, 2.6 g of aluminum chloride and 0.82 ml of ethanol was prepared and divided into four parts, each of which was added to the reaction mixture maintained at 100°C at intervals of 30 minutes. The reaction mixture was heated for 30 minutes after the final addition, and it was then treated by the same manner as in Example 1 to obtain 16.6 g (yield: 73.5%) of α-chloro-β-(3,4-dimethoxyphenyl)-propionitrile.

EXAMPLE 7

In a modification of Example 6, 12.2 g of 1,2-methylenedioxybenzene and 18.6 g of 2,3-dichloropropionitrile were used as starting materials. 14.4 g (yield: 68.8%) of α-chloro-β-3,4-methylenedioxyphenyl)-propionitrile was obtained as a fraction having a boiling point of 141° – 145°C/1.2 mmHg by distillation. The values of elemental analysis of this fraction agreed well with the calculated ones as shown in the following:

| | C | H | N | Cl(%) |
|---|---|---|---|---|
| Found: | 57.49 | 3.91 | 6.63 | 17.30 |
| Calculated for $C_{10}H_8NO_2Cl$: | 57.29 | 3.85 | 6.68 | 16.91 |

EXAMPLE 8

To the same starting solution as used in Example 1, 1.3 g of aluminum chloride anhydride was added and dissolved completely. 0.2 ml of 10% sulfuric acid was added thereto. The reaction mixture was heated to 100°C with stirring for 2 hours. After the mixture was cooled, 0.7 g of aluminum chloride anhydride, 0.7 g of 2,3-dichloropropionitrile and 0.1 ml of 10% sulfuric acid was added again. The mixture was maintained at 100°C for 30 minutes. Thereafter, the above-mentioned procedure was repeated three times. The resulting solution was treated by the same method as in Example 1 to obtain 15.8 g (yield: 69.9%) of α-chloro-β-(3,4-dimethoxyphenyl)-propionitrile.

EXAMPLE 9

To a mixture consisting of 12.2 g (0.1 mole) of 1,2-methylenedioxybenzene and 18.6 g (0.15 mole) of 2,3-dichloropropionitrile, 1.3 g of aluminum chloride anhydride was added and dissolved completely. 0.2 ml of 10% sulfuric acid was added thereto. The mixture was maintained at 100°C with stirring for 2 hours. And then a solution of 1.3 g of aluminum chloride anhydride and 3.1 g of 2,3-dichloropropionitrile and 0.1 ml of 10%-sulfuric acid was added thereto. A solution of aluminum chloride anhydride and 2,3-dichloropropionitrile, and 10%-sulfuric acid was added further three times at intervals of 30 minutes. The reaction mixture was reacted at the same temperature with stirring for the overall period of the above adding procedure. The mixture was stirred at 100°C for 30 minutes after the final addition, and was cooled. The resulting solution was treated by the similar manner as in Example 1 to obtain 13.4 g of α-chloro-β-(3,4-methylenedioxyphenyl)-propionitrile as a fraction having a boiling point of 139° – 140°C/1.0 mmHg. The values of elemental analysis of this fraction agreed well with the calculated ones.

|  | C | H | N | Cl(%) |
|---|---|---|---|---|
| Found: | 57.55 | 4.03 | 6.47 | 16.63 |
| Calculated for $C_{10}H_8NO_2Cl$: | 57.20 | 3.85 | 6.68 | 16.91 |

EXAMPLE 10

In the modification of Example 9, 12.4 g (0.1 mole) of guaiacol was used instead of 1,2-methylenedioxybenzene.

12.4 g (yield: 58.6%) of α-chloro-β-(3(4)-hydroxy-4(3)-methoxyphenyl)-propionitrile was obtained as a fraction having a boiling point of 153° – 157.5°C/2.8 mmHg. This crude product was redistilled to obtain a fraction having a boiling point of 147° – 149°C/1.5 mmHg. The data of elemental analysis were:

|  | C | H | N | Cl(%) |
|---|---|---|---|---|
| Found: | 57.06 | 4.87 | 6.51 | 16.46 |
| Calculated for $C_{10}H_{10}NO_2Cl$: | 56.75 | 4.67 | 6.62 | 16.75 |

EXAMPLE 11

A mixture consisting of 15.0 g (0.1 mole) of 1,2-isopropylidenedioxybenzene and 14.9 g (0.12 mole) of 2,3-dichloropropionitrile was prepared, and 1.6 g (0.012 mole) of zinc chloride and 0.4 g (0.003 mole) of aluminum chloride were added thereto. The reaction mixture was heated to 90°C with stirring for 1 hour. The resulting solution was treated by the same method as in Example 1. 10.9 g (yield: 62%) of α-chloro-β-(3,4-isopropylidene-dioxyphenyl)-propionitrile was obtained as a fraction having a boiling point of 135° – 142°C/2 mmHg by distillation under reduced pressure. The crude compound was dissolved in hot ethanol, and then was cooled. There was obtained a crystal having a melting point of from 30° to 31°C.

EXAMPLE 12

A mixture of 19.0 g (0.1 mole) of 1,2-cyclohexylidene-dioxybenzene and 14.9 g (0.12 mole) of 2,3-dichloropropionitrile was prepared, and 1.6 g (0.012 mole) of zinc chloride and 0.4 g (0.003 mole) of aluminum chloride were added thereto. The reaction mixture was heated to 105°C with stirring for 1.5 hours. After the resulting solution was cooled on standing, it was poured into 100 ml of ice water and then was extracted with three 100 ml portions of chloroform. The chloroform layer was dired with sodium sulfate anhydride. After chloroform was distilled off, a small amount of ethanol was added to the residue. Upon cooling the resulting solution, 12.5 g (yield: 45%) of α-chloro-β-(3,4-cyclohexylidene-dioxyphenyl)-propionitrile was obtained in crystalline state. Recrystallization from ethanol gave crystals having a melting point of from 105° to 107°C.

EXAMPLE 13

A mixture consisting of 5.5 g (0.05 mole) of 1,2-dihydroxybenzene, 12.4g (0.1 mole) of 2,3-dichloropropionitrile, 13.6 g (0.1 mole) of zinc chloride and 40 ml of benzene was heated to 80°C with stirring for 3 hours. The resulting solution was cooled and poured into 50 ml of ice water, and then said solution was extracted with three 200 ml portions of chloroform. The chloroform layer was dried and condensed under reduced pressure, and then 50 ml of hydrochloric acid (4 normal) was added to the residue. The solution was refluxed with stirring for 1 hour. After the reaction mixture was cooled to room temperature, it was extracted with three 200 ml portions of ether, and was dried and condensed.

60 ml of 28%-ammonia water was added to the residue, which was heated to 120°C in an autoclave for 30 minutes. The content was cooled and condensed under reduced pressure, and then crystals separated out. The chemical and physical properties of these crystals agreed well with those of 3,4-dihydroxyphenylalanine. It was confirmed thereby that α-chloro-β-(3,4-dihydroxyphenyl)-propionitrile formed in the reaction mixture.

EXAMPLE 14

4.5 g (0.013 mole) of tri-O-phenylenediborate which was produced by reacting 1,2-dihydroxybenzene with boric acid, 6.0 g (0.048 mole) of 2,3-dichloropropionitrile, 0.27 g (0.002 mole) of aluminum chloride and 0.54 g (0.004 mole) of zinc chloride were added to 4 ml of nitromethane. The reaction mixture was heated to 80°C with stirring for 1 hour. After the resulting solution was cooled on standing, 60 ml of hydrochloric acid (4 normal) was added thereto. The resulting solution was refluxed with heating for 1 hour. The reaction solution was cooled to room temperature and was extracted with three 50 ml portions of ether. The ether solution was dried and condensed. 140 ml of 28%-ammonia water was added to the residue, which was charged into an autoclave reactor.

The reactor was heated to 120°C for 40 minutes. The content was cooled, condensed under reduced pressure, and was crystallized immediately. The chemical and physical properties of the crystals agreed well with those of 3,4-dihydroxyphenylalanine. It was confirmed thereby that tri-[α-chloro-β-(3,4-dioxyphenyl)-propionitrile]-diborate formed in the reaction mixture.

The following experiments were conducted to show that polyhalides which are analogous to 2,3-dichloropropionitrile, will not react with 1,2-dihydroxybenzene or the O-protected derivatives thereof.

EXPERIMENT 1

A mixture consisting of 13.8 g (0.1 mole) of veratrol and 18.6 g (0.15 mole) of 2,3-dichloropropionitrile was prepared, and 1.3 g of anhydrous aluminum chloride was added thereto. The reaction mixture was heated at 100°C for 6 hours.

After the resulting mixture was cooled, it was added with 200 ml of 48% hydrobromic acid and was refluxed for 3 hours. The mixture was condensed and added with 300 ml of 28% ammonia water, and then heated at 120°C for 30 minutes in an autoclave. The content of the reactor was subjected to the thin layer chromatography using 0.2% ninhydrin-methanol solution as a stain reagent. As a result, 3,4-dihydroxyphenylalanine was observed at Rf=0.46 (n-butanol-acetic acid-water; 2:1:1) and at Rf=0.34 (phenol-water; 3:1).

EXPERIMENT 2

A mixture consisting of 15.0 g (0.1 mole) of 1,2-isopropylidenedioxybenzene and 18.6 g (0.15 mole) of 2,3-dichloropropionitrile was prepared, and 1.3 g of anhydrous aluminum chloride was added thereto. The reaction mixture was then treated in the same manner as in Experiment 1.

It was found by the same chromatography as in Experiment 1 that 3,4-dihydroxyphenylalanine was obtained in the resulting mixture.

EXPERIMENT 3

A mixture consisting of 13.8 g (0.1 mole) of veratrol and 23.4 g (0.15 mole) 2,3-dichloro-propionic acid methyl ester was prepared, and 1.3 g of anhydrous aluminum chloride was added thereto. The reaction mixture was treated in the same manner as in Experiment 1.

The resulted reaction mixture was subjected to the same thin layer chromatography as in Experiment 1, but no 3,4-dihydroxyphenylalanine was observed.

EXPERIMENT 4

A mixture consisting of 13.8 g (0.1 mole) of veratrol and 20.7 g (0.15 mole) of 2,3-dichloro-2-methyl-propionitrile was prepared, and 1.3 g of anhydrous aluminum chloride was added thereto. The mixture was heated at 100°C for 6 hours. After the resulting mixture was cooled, it was poured into 100 ml of water containing chips of ice and then extracted with three 50 ml portions of chloroform. These chloroform solutions were combined and washed successively with 100 ml of water, 100 ml of 5% sodium bicarbonate solution and 100 ml of water, and then dried with anhydrous sodium sulfate.

After filtration, the filtrate was added with chloroform till the whole volume became 200 ml. A sample of the chloroform solution was taken out and was subjected to gas chromatography in order to determine the amount of the unreacted veratrol. As a result, it was found that 13.6 g of veratrol (which corresponds to 98.5% of the starting veratrol) remained in the whole chloroform solution.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a compound selected from the group consisting of α-chloro-β-(3,4-dihydroxyphenyl)-propionitrile and an O-protected derivative thereof, having the formula:

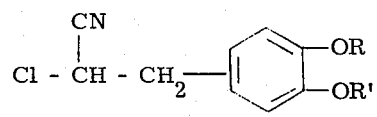

wherein R and R' are independently selected from the group consisting of lower alkyl having from 1 to 6 carbon atoms and hydrogen, or R and R' may be taken together to form a member selected from the group consisting of lower alkylene having from 2 to 6 carbon atoms, alkylidene having from 2 to 6 carbon atoms, and cyclohexylidene, which comprises the step of reacting 1,2-dihydroxybenzene or an O-protected derivative thereof of the formula

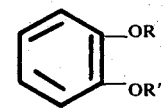

wherein R and R' are as defined above, with 2,3-dichloropropionitrile at a mole ratio of said 2,3-dihydroxybenzene or the O-protected derivative thereof: 1,2-dichloropropionitrile of 1:0.6–1.2 at a temperature from 50°C to 150°C in the presence of a Lewis acid so as to form said α-chloro-β-(3,4-dihydroxyphenyl)-propionitrile or its corresponding O-protected derivative.

2. A process for preparing an O-protected derivative of α-chloro-β-(3,4-dihydroxyphenyl)-propionitrile having the formula

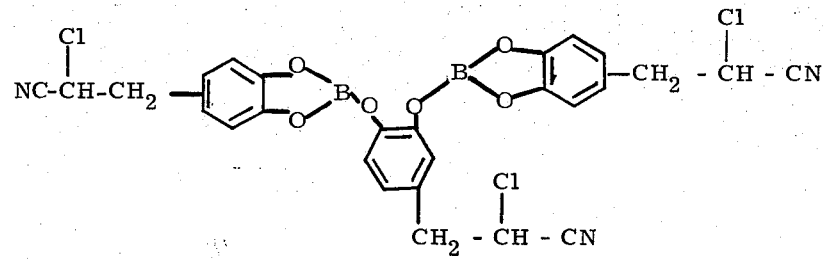

which comprises the steps of reacting an O-protected derivative of the formula

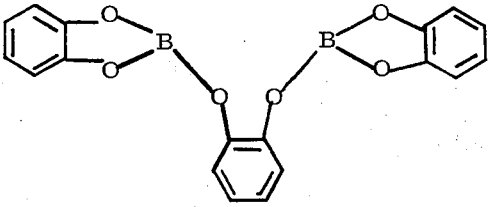

with 2,3-dichloropropionitrile at a mole ratio of a phenyl ring of said O-protected derivative: 2,3-dichloropropionitrile of 1 : 0.6 – 1.2 at a temperature from 50°C to 150°C in the presence of a Lewis acid so as to form said O-protected derivative of α-chloro-β-(3,4-dihydroxyphenyl)propionitrile.

3. The process of claim 1 wherein said 2,3-dichloropropionitrile is present in an amount from 1.0–1.2 moles per mole of said 1,2-dihydroxybenzene or its O-protected derivative thereof.

4. The process of claim 1, wherein said reaction is conducted in the presence of a co-catalyst selected from the group consisting of water, mineral acid, lower alkyl alcohol, silica gel and silicon tetrachloride.

5. The process of claim 1, wherein said co-catalyst is present in an amount of less than 1.0 moles per mole of Lewis acid.

6. The process of claim 1, wherein said co-catalyst is a lower alkanol selected from the group consisting of methanol, ethanol, propanol and butanol.

* * * * *